United States Patent [19]
Scanlon et al.

[11] 3,877,718
[45] Apr. 15, 1975

[54] HIGH STRENGTH AUXILIARY AXLE SUSPENSION SYSTEM

[75] Inventors: Raymond M. Scanlon, Montgomery, Ala.; Stephen Turner, Jr., Youngstown, Ohio

[73] Assignees: TWM Manufacturing Company, Inc., Canton, ; by said Stephen Turner, Jr.; WDT, Warren, both of Ohio ; by said Stephen Turner, Jr.

[22] Filed: Feb. 27, 1973

[21] Appl. No.: 336,289

Related U.S. Application Data

[63] Continuation-in-part of Ser. No. 293,617, Sept. 29, 1972, abandoned, which is a continuation-in-part of Ser. No. 273,552, July 20, 1972, abandoned.

[52] U.S. Cl. .......................... 280/124 F; 180/24.02
[51] Int. Cl. ............................................... B60g 1/46
[58] Field of Search ............ 267/24, 18; 280/124 F; 180/22 D, 22 E, 24.02

[56] References Cited
UNITED STATES PATENTS

| | | | |
|---|---|---|---|
| 3,617,072 | 11/1971 | Turner | 280/124 F |
| 3,653,683 | 4/1972 | Hendrickson | 280/124 F |
| 3,730,548 | 5/1973 | Thaxton | 280/124 F |
| 3,740,071 | 6/1973 | Bilas | 180/24.02 |

*Primary Examiner*—Philip Goodman
*Attorney, Agent, or Firm*—Hall & Myers

[57] ABSTRACT

An auxiliary axle suspension system of improved strength is provided. As it relates to a wheeled vehicle having two outer, longitudinally-extending frame members, the system is comprised of an axle extending perpendicularly to the longitudinal direction of the frame members, a leaf spring located substantially directly under each frame member and extending in the longitudinal direction thereof, the leaf springs being slidably connected at their ends by spring hanger members connected to their respective frame member and extending substantially vertically from beneath each frame member, means for connecting the axle to the springs at about the springs' central portion, each spring being normally biased upwardly so that wheels attached to the axle are normally held above the road surface, at least one vertically flexible pneumatic chamber located between each leaf spring and its respective frame member, each pneumatic chamber being located in a spread configuration, means located substantially directly under the frame member when the system is installed for taking up the horizontal force components of braking and dynamic operating forces, and means connecting the pneumatic chambers to the frame members and the springs, which means also offset the chambers from the vertical plane of the axle, such that when pneumatic pressure is applied to the chamber it elongates, forcing the axle downwardly against the upward bias of the spring to engage the wheels with the road surface.

17 Claims, 11 Drawing Figures

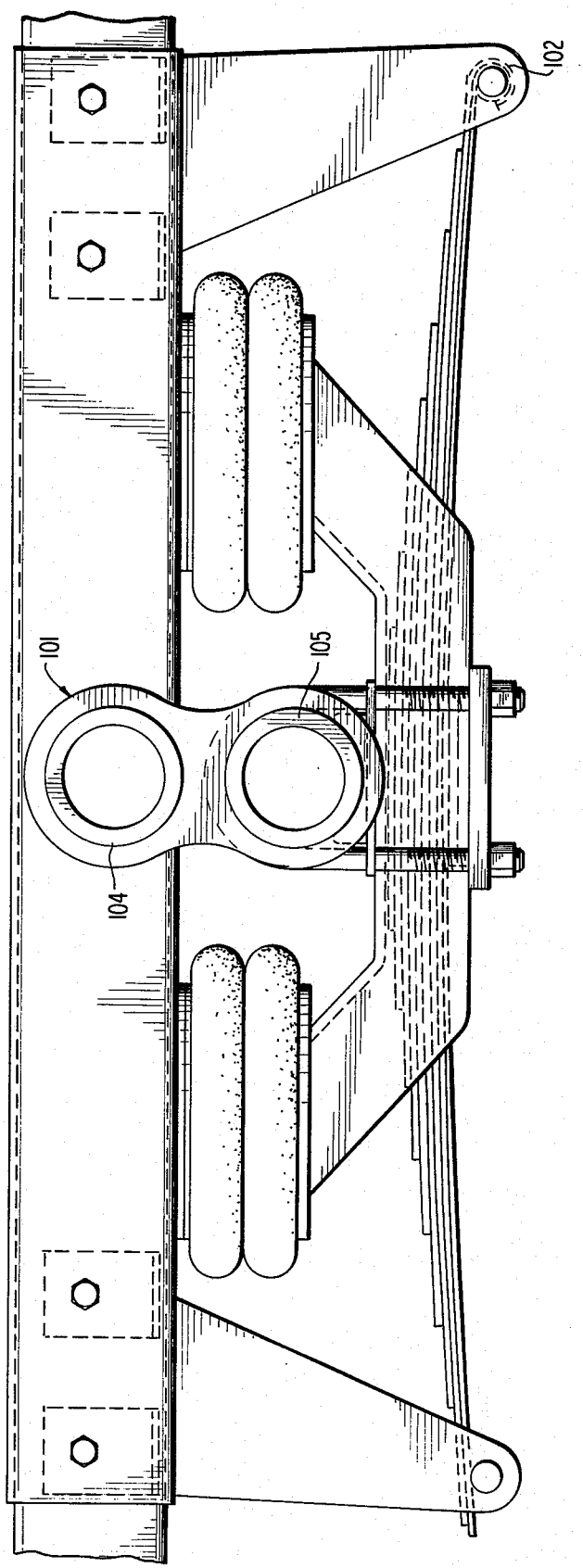

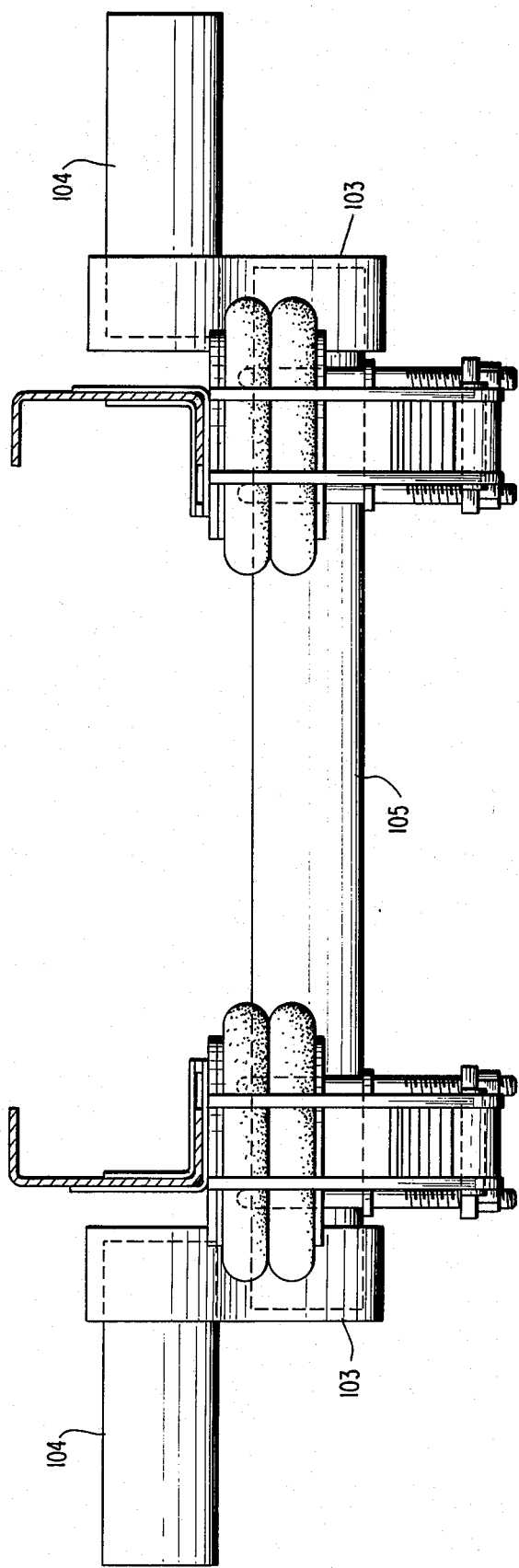

HIGH STRENGTH AUXILIARY AXLE SUSPENSION SYSTEM

RELATED APPLICATIONS

This is a continuation-in-part of copending application Ser. No. 293,617 filed Sept. 29, 1972, now abandoned which in turn is a continuation-in-part of copending application Ser. No. 273,552 filed July 20, 1972 now abandoned.

This invention relates to auxiliary axle suspension systems for wheeled vehicles. More particularly, this invention relates to auxiliary axle suspension systems of improved strength and durability.

It is well-known that in a load-carrying wheeled vehicle, the greater the number of load-carrying wheels, the greater the load which can be carried without damage to the road surface. Indeed, while most states limit the gross weight of a vehicle traveling on state roads, many states specify a gross weight which each axle of the vehicle may support. In such cases it follows that the greater the number of wheel-bearing axles on the vehicle, the greater will be the allowed gross weight. Unfortunately, the greater the number of axles spaced longitudinally of the vehicle, the greater the tire scuffing when the vehicle turns and the greater the power requirements to overcome the drag of such scuffing.

In order to alleviate the aforesaid tire scuffing when multiple axle suspensions are employed, it has been proposed to steer or caster one or more of such multiple axles. This, however, is a very complex and expensive solution which is not always adaptable to existing vehicles.

As disclosed in U.S. Pat. No. 3,285,621, the problem of tire scuffing when a plurality of axles must be used to bear an unduly heavy load as the vehicle travels, is overcome by utilizing the principle of an auxiliary vehicle axle which is selectively shiftable toward and away from the road surface. Such an auxiliary vehicle axle provides for increased load capacity of the vehicle while minimizing tire scuffing, power consumption, and limitations on maneuverability of the vehicle. Generally speaking, the preferred embodiment as contemplated by this patent comprises a wheeled vehicle having longitudinally extending frame members in a side-by-side relation and each frame member being disposed adjacent a respective side of the vehicle. There are then provided at least first and second axles underlying the frame members and extending transversely thereof, the axles being spaced from each other longitudinally of the vehicle and each mounting wheels along which the vehicle may travel. There is further provided a means connecting said first axle to said frame members whereby said first axle provides a primary means of vehicle support. Leaf springs are provided on each side of the vehicle adjacent their respective frame members and extending longitudinally thereof, each leaf spring having its end portion secured to respective frame members and having its intermediate portion overlying and secured to said second axle, said leaf springs cooperating to normally bias said second axle upwardly to raise the wheels mounted thereon above the surface along which the vehicle travels. There are then provided vertically flexible pneumatic chambers extending between respective frame members and said second axle, and means for selectively applying pneumatic pressure to saic chambers to cause vertical elongation thereof, thus biasing said second axle downwardly against the force exerted by said springs to lower the wheels mounted thereon into forcible engagement with the vehicle travel surface. By release of the pneumatic pressure, the upwardly biased springs retract the wheels from engagement with the vehicle travel surface when the auxiliary second axle is no longer needed to bear the load. This has become known in the art as a "positive return" system.

The basic concept disclosed in this patent was found to be extremely useful in overcoming the scuffing problem described above. It was found, however, that when a truck or semi-trailer vehicle was called upon to carry a load of greater than about 6,000 lbs. and usually greater than about 14,000 lbs., per axle, a great amount of force, especially during the braking of the vehicle, is placed upon the ends of the leaf springs in the auxiliary axle combination, which force thus tends to be a source of potential danger. In addition, it was further found that if the vertically extending bracket means used to connect the outer ends of the leaf springs to their respective frame members were connected such as by weld joints or by bolting through the flange portions of the frame members (e.g. I-beams, channel beams or the like), a further potential source of danger arose. In view of the heavy load being carried by the axle and the great force placed upon the bracket means which connect the leaf springs to the frame member, weld joints were found entirely inadequate to provide the necessary safety factor for the system. It was further found, that if the flanges of the frame members were violated by placing bolts therethrough, for some reason, probably physical or metallurgical, the frame member's strength was greatly weakened to the point where fracturing or fatiguing of the frame member might actually occur.

The invention disclosed in U.S. Pat. No. 3,617,072 solved the above problems by providing a unique modification of the basic concept of U.S. Pat. No. 3,285,621. This unique modification generally comprised, in combination with the basic positive return system, at least two torque arms extending longitudinally along the length of the axle in the forward or rearward direction of the vehicle and being located between the axle and the spring hanger bracket means for connecting the ends of the leaf springs to the vehicle. The hanger bracket means for connecting the leaf springs to the vehicle were designed in such a manner to allow the springs to slide longitudinally therewithin. In addition, the problem of frame member strength was overcome by providing a combination of angle iron-bracket means which allowed for bolts to connect same to the vertically extending intermediate member of the frame member but because the flanges of the angle irons extended beyond the flanges of the frame member allowed for securing of the flange members of the frame member to the angled members without violating the structure of the flanges of the frame member.

Thus, by utilizing the principle of an auxiliary axle as disclosed in U.S. Pat. No. 3,285,621 and modifying it in accordance with the teachings of U.S. Pat. No. 3,617,072 not only were the advantages disclosed in the former patent achieved, but additional safety features allowing for greater load weights and improved axle alignment were also made possible.

The embodiment employed in the practice of the invention disclosed in U.S. Pat. No. 3,617,072 is that as generally illustrated in the drawings accompanying that patent. Such an embodiment provides a valuable solution to the need for a reliable and safe auxiliary axle system. In this embodiment, a pneumatic chamber is located not only between the axle and the vehicle but also directly within the vertical plane of the axle (i.e. in a direct vertical line between the axle and frame). This presented no space problem with certain commercially available trucks and many trailers needing auxiliary axles and which have their frames at relatively high elevations from the road surface. On the other hand, there grew a significant demand to employ this unique and reliable system on vehicles whose frames were designed relatively low to the road surface. Because of the vertical dimensions of the pneumatic chambers which are employed in practice, it was not always possible to employ a straight axle and, at the same time, obtain the desired clearance between the road and tire, when the system was in its retracted position.

This problem was readily solved for many vehicles by the employment of a conventional "bent" or "drop" axle, as they are known in the art. Generally speaking such axles are U-shaped with the wheels being attached to horizontal legs extending from the upper termination of the vertical legs of the U. Thus, by making the vertical legs of the U the requisite height, the desired tire clearance was achieved, but only for those many types of vehicles having relatively low clearance. The problem was not completely solved however, because there are currently being manufactured a significant number of vehicles which have what may be termed "inordinately low" frame clearance and which need an auxiliary axle system. Even with a dropaxle, it was found that the systems of the afore-mentioned patents did not provide sufficient ground to tire clearance.

Drop-axles, while used conventionally in the industry whereever necessity dictates, are less desirable than straight axles. This is because, for example, they are more expensive than straight axles, somewhat more difficult to install, and most importantly, tend to be somewhat weaker than straight axles. This latter draw-back is of particular importance since larger, more expensive braking systems and increased metal thicknesses (all to the economical detriment of the system) are often necessary to employ in order to be able to certify the drop-axle system at the same load-bearing weight as a straight axle system without such modifications. This problem becomes especially troublesome in the upper load-bearing limits (i.e. about 20,000 lbs./axle or more) particularly in view of the very stringent requirements which must be met for certification as set forth in newly proposed and enacted federal regulations.

It is, therefore, evident that a significant contribution to the art could be made by the development of a system which retains the unique and reliable features of the embodiments of U.S. Pat. Nos. 3,285,621 and 3,617,072 and yet avoids the need to employ a drop-axle on trucks with relatively low-clearance frames. It is also evident that a further significant contribution could be made by the development of a system which retains the features of the aforesaid patents and yet can be used with drop-axles to provide a strong reliable auxiliary axle system despite the fact that the frame of the truck is inordinately low to the extent that even with a drop-axle clearance is insufficient to allow the formerly patented devices to be used.

One system presently known in the art, mitigates somewhat the above-described space or clearance problem by offsetting the pneumatic chambers from the vertical plane of the axle. In this system there is employed a four-bag chamber system in combination with a straight axle and a pair of leafsprings biased upwardly. In this system, space is inherently conserved by locating one pneumatic chamber on each end of a stationary rocker arm bolted or welded at its fulcrum point to the underside of the axle. Two of such rocker arms are employed and extend in the longitudinal direction of the frames of the vehicle. They are generally located somewhat inwardly and not centered directly under the frames.

In such a design, the height of the axle is conserved and added to the clearance because the rocker arms offset the air bags from the vertical plane of the axle. Additional vertical space is further inherently conserved in this known system by locating the leaf-springs outwardly (i.e. outboard) of the vehicle frames. This is accomplished by having the springs overlay, and be connected at their central portion to, the outboard extension of the axle which lies between the wheel and the frame and by connecting the springs at their ends to pins which extend outboard of the vehicle from downwardly extending brackets connected to the frame of the vehicle.

It has been found that this design, while it inherently conserves vertical space, is of such a nature as to present several points of both real and potential weakness. For example, the location of the springs outboard of the frame and the attachment of their ends to the frame via outboard pins presents a weak point affecting the overall load-bearing capacity of the system. As another example, the rocker arms are located in such a way as to cause the center line (i.e., neutral axis or center of gravity) of the airbags to be significantly offset a relatively large distance inwardly from the center line (i.e., neutral axis or center of gravity) of the frame thus creating further serious weaknesses within the system. As still a further example, the welding or bolting of the rocker arms to the underside of the axle presents a further point of weakness by the very nature of this connection.

Because of these weaknesses, the above-described known four-bag design achieves no real advantage over the use of a dropaxle. In fact, in many instances, and particularly at the higher load-bearing weights it is inferior either structurally or economically (i.e., to achieve the same structural strength) to the drop-axle concept. In addition, by not employing a drop-axle, it is not useful on vehicles having inordinately low frames.

The terms relatively high, relatively low and inordinately low are used herein according to their normal meaning in the truck and semi-trailer art. Generally speaking, relatively high frames are usually those having a clearance greater than about 35 inches above the ground, relatively low frames are those between about 27-34 inches from the ground, and inordinately low frames are those less than 27 inches and usually between about 26-24 inches from the ground.

In view of the above, it is apparent that there exists a definite need in the art for an auxiliary axle suspension system having excellent strength, reliability and also economy and which may be employed on a full range of vehicle frames regardless of height. It is also apparent that there exists a need in the art for a system which adapts the significant benefits of the systems disclosed in the aforesaid patents, and simultaneously improves the system's strength and/or economics and which may be used, regardless of the height of the frame of the vehicle upon which the system will be employed. It is also evident from the above that there exists a need in the art for a reliable auxiliary axle suspension system which can be easily and economically certified as capable of safely bearing a load per axle over a wide range of conventional load-limits, particularly at load-limits of 18,000 lbs./axle or more, and especially of about 20,000 lbs./axle. It is still further apparent that there exists a need in the art for a reliable, safe, auxiliary axle suspension system which may be employed on wheeled vehicles having relatively low frame-to-ground clearance without employing a drop-axle, but rather a straight axle of conventional tube thickness (i.e. one-half inch or five-eighths inch), particularly where the system is capable of being certified to bear the upper load-limits per axle as enumerated above. It is still further evident that there exists a need in the art for an auxiliary axle suspension system which may be employed with a drop-axle particularly on vehicles of inordinately low frame clearance, which system is strong and reliable, and particularly where the system is capable of being certified to bear the upper load-limits per axle as enumerated above.

It is a purpose of this invention to fulfill these needs in the art, as well as others which will become more apparent to the skilled artisan after being apprised of this disclosure.

This invention accomplishes its purpose by providing a unique auxiliary axle suspension system for wheeled vehicles having an axle and at least one longitudinally extending frame member, the system comprising at least one leaf spring, at least one vertically flexible pneumatic chamber, spring hanger means for retaining the leaf spring at its ends, means which retain the leaf spring at a point intermediate its ends in a normally upwardly biased configuration, and means for offsetting the pneumatic chamber from the vertical plane of the axle when the system is connected thereto, said offsetting means locating the pneumatic chamber between the axle and the frame member such that when pneumatic pressure is applied to the chamber it expands, forcing the axle downwardly against the normal upward bias of the leaf spring. High strength is built into such a system by employing either and preferably both of two unique concepts. In the first concept, the system includes means for taking up the horizontal force components of braking and dynamic operating forces, which means are located substantially directly under the longitudinally extending frame member. In the second concept, the vertically flexible chamber is located not only between the axle and the frame member, but in a spread configuration as well.

The means for taking up the horizontal force components of braking and dynamic operating forces may take many forms. Generally speaking, however, and for the purposes of this invention such means will comprise either the leaf springs themselves, as by shackling one end thereof to the spring hanger means, or a radius rod extending in either the forward or rearward direction from the axle.

Braking and dynamic operating forces are known forces in the vehicle art and the use of this term is used herein in accordance with its known meaning. Braking forces are those which occur during braking or stopping of the vehicle while the dynamic operating forces are those which occur for example when the vehicle contacts a pot-hole, bump, curb or the like.

The term "substantially directly under" as it applies to the location of the means for taking up the horizontal forces components (referred to hereinafter at times and for convenience as horizontal force component means) is used herein to mean that such means are so located as to effectively translate, in a substantially noneccentric way, the said force components into the load bearing members of the vehicle designed to handle such forces, i.e. the frame members. In those preferred instances where such means are comprised of the leaf spring or radius rod, such substantially noneccentric translation is usually achieved by locating the spring or rod in such a way that at least one vertical plane defined by one of the extremities of the leaf spring or rod falls between the vertical planes of the horizontal extremities of the frame members, or vice versa. In other words, that there be horizontal overlap between the spring or rod and the frame member. More precise centering for maximum effect will differ depending upon various design contingencies. Generally speaking, however, it is usually preferred when employing conventional C, L, or I frame members and leaf springs or radius rods of conventional width, to locate the spring or rod such that the "center line" (i.e. neutral axis or center of gravity) of the leaf spring or rod will fall between the vertical planes of the horizontal extremities of the frame member. In the most preferred forms, the center line of the spring or rod should be vertically aligned as closely as possible with the center line (i.e. neutral axis or center of gravity) of the frame member.

In practice it is not always possible to achieve exact alignment of center lines due to various contingencies, usually of a design or installation nature. Generally speaking, however, it has been found that good results are achieved if the center lines are not offset, inwardly or outwardly, more than about 2 inches. Further improved, and in fact, excellent results are achieved, if the offset either inward or outward, is about 1 ½ inches or less. It has been found that when such a configuration is achieved, a significant increase in strength is realized, due primarily to excellent translation of forces into the vehicle's member best able to handle such forces and the elimination, in preferred embodiments, of the need to employ outboard pins.

The term "in a spread configuration" as it applies to the location of the vertically flexible pneumatic chamber(s) is used herein to define a position in which the chambers aid in improving the strength of the system despite the fact that they are offset from the vertical plane of the axle, by spreading or moving the chambers outwardly, as from the inward position which they now assume in the multibag prior art device described above. Such spreading is generally definable in terms of an inward limit for offset. That is to say the term in a spread configuration means that the vertical center line (i.e. neutral axis or center of gravity) of the chamber(s), should not be spaced inwardly from the center line (as defined above) of the frame member more than about 20% of the width (parallel to the axle, which in the case of a conventional round chamber is its diameter) of the chamber when expanded, and preferably less than about 10%.

Similarly as discussed above, more precise location will vary as different parts or types of equipment are employed. Usually, and with conventional equipment it is preferable that the center line of the chamber(s) be not more than about 1 ¾ inches and preferably less than about 1 inch, inwardly from the center line of the frame member when employing a chamber of about 12–13 inches in diameter (when expanded). It is noted at this point, that the prior art multibag device described above, offsets inwardly the center line of its bags (having an expanded diameter of about 13 inches) about 3 inches or more from the center line of the frame member. This, as described above, presents a point of weakness and also necessitates the use of rather large inward extension plates to secure the bags to the frame member.

There is no theoretical limit to how far outwardly the chambers can be spread. That is to say, theoretically, the closer to the end of the axle the chambers are located, the greater the strength achieved. On the other hand, and in practice, various limitations on spread, such as tire size, are imposed by the nature of the vehicle upon which the system is to be installed. Thus, in practice, the chambers will usually be spead as far as possible toward the ends of the axle keeping in mind such limitations as well as the effect of spread upon economy (such as if extension plates etc. become necessary because the chambers are outboard of the frame member) versus the need for exceptionally high strength.

It has been found that such a chamber configuration, i.e., where the chambers are offset from the vertical plane of the axle and simultaneously are in a spread configuration — in contradistinction to the known multi-bag constructions as discussed above — not only conserves space, but in a uniquely economic way, provides increased certifiable strength. This is believed primarily due to two factors. Firstly, by locating the chambers closer to the wheels (resulting from spreading them outwardly from the prior art's inward position) it is believed that lever-arm weakening forces at the wheels are reduced. Secondly, by spreading the chambers from the inward position employed by the prior art, axle stress is reduced due to the reduction of axle bending moment. Thus, by providing the chambers in the configuration described significant improvement is achieved.

While the invention has been described above with respect to the placement of the horizontaal force component means substantially directly under the frame member or the placement of the chambers in spread configuration, it is preferred, for maximum strengthening effect, to employ both simultaneously. Similarly, while this invention has been described above with respect to employing either a radius rod or spring as the horizontal force component means, it is preferred where frame height will allow to employ a radius rod as such means, but to locate the springs substantially directly under (as defined above) the frame member as well. In such an embodiment the springs are connected at their ends in sliding fashion so that the great bulk of the horizontal component is translated by the radius rod. Such a configuration is preferred since (1) the radius rod is best equipped to translate such forces and (2) by locating both the rod and spring substantially directly under the frame member better concentric loading on all parts and thus increased strength is obtained.

As stated above, by providing either the horizontal force component means or the chamber(s) or both and preferably all of the components substantially directly under the longitudinally extending frame member, a safe, strong and reliable system is provided which, in most instances, using only conventional equipment and a straight auxiliary axle of conventional wall thickness or a properly designed drop-axle, may be certified as having a load-bearing capacity of greater than about 18,000 lbs. per axle and particularly at about 20,000 lbs. per axle. Space is conserved in such a system to the extent that straight axles may be employed even though the frame has a relatively low clearance. On the other hand, the systems of this invention are also capable of such high certifiable strengths when using drop axles — such as on inordinately low frames.

In a particularly preferred embodiment of this invention two pneumatic chambers are employed for each leaf spring. Since most wheeled vehicles contain a frame member extending longitudinally along both sides of the vehicle, the preferred embodiments of this invention employ one leaf-spring (i.e. of multiple leaves) and two chambers per such frame member, one chamber being offset forward and one aft of the auxiliary axle. In addition each spring will be attached to the vehicle by a spring retaining means and spring hanger means also located substantially directly under the frame member. And where design will allow the spring retaining means and spring hanger means will have located therebetween and attached thereto, radius rods (i.e. torque arms) as described above, all of the components being located in respect of its frame member as described.

This invention will now be described with reference to specific embodiments illustrated in the appended drawings wherein:

IN THE DRAWINGS:

FIG. 4 is a partial rear plan, partially sectionalized view taken along line 4—4 of FIG. 1;

FIG. 8 is a side plan, partially sectionalized view of an auxiliary axle suspension system employing a drop-axle as contemplated by this invention and wherein the leaf spring is shackled so as to act as the horizontal force component means;

FIG. 9 is a partial rear plan, partially sectionalized view of the system of FIG. 8;

Figure 1:
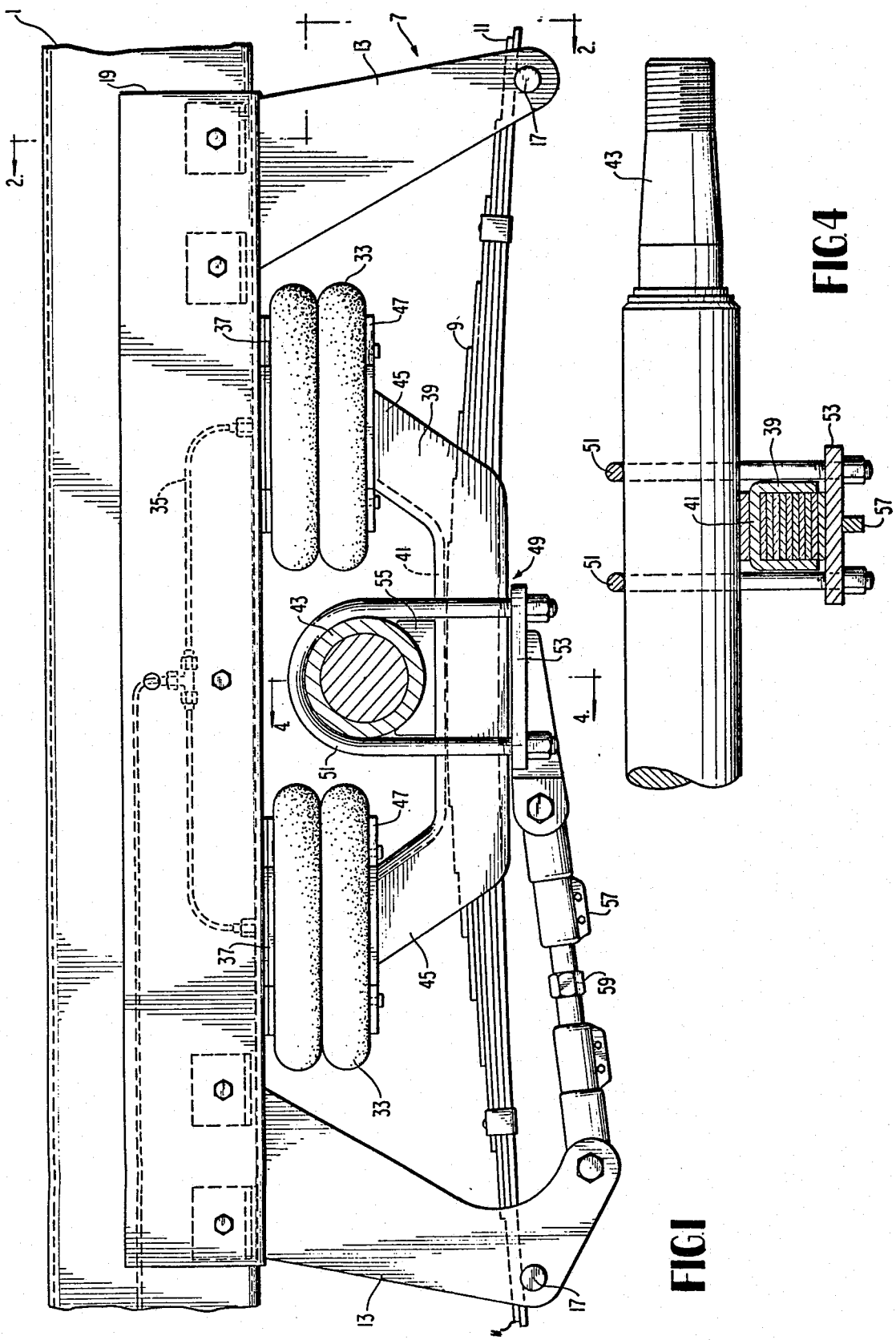
FIG. 1 is a side plan, partially sectionalized view of an auxiliary axle suspension system employing a straight axle as contemplated by this invention.

FIG. 1 illustrates a particularly preferred embodiment of the invention described hereinabove. In this figure, there is shown a frame member 1 conventionally employed on wheeled vehicles such as trucks or semi-trailers. For most trucks and semi-trailers, frame member 1 extends longitudinally along each outer length of the vehicle. Thus, in the preferred embodiments of this invention, FIG. 1 will be substantially duplicated, except as otherwise indicated, for each side of the wheel vehicle. Such is illustrated in FIGS. 2 and 3.

Figure 2:
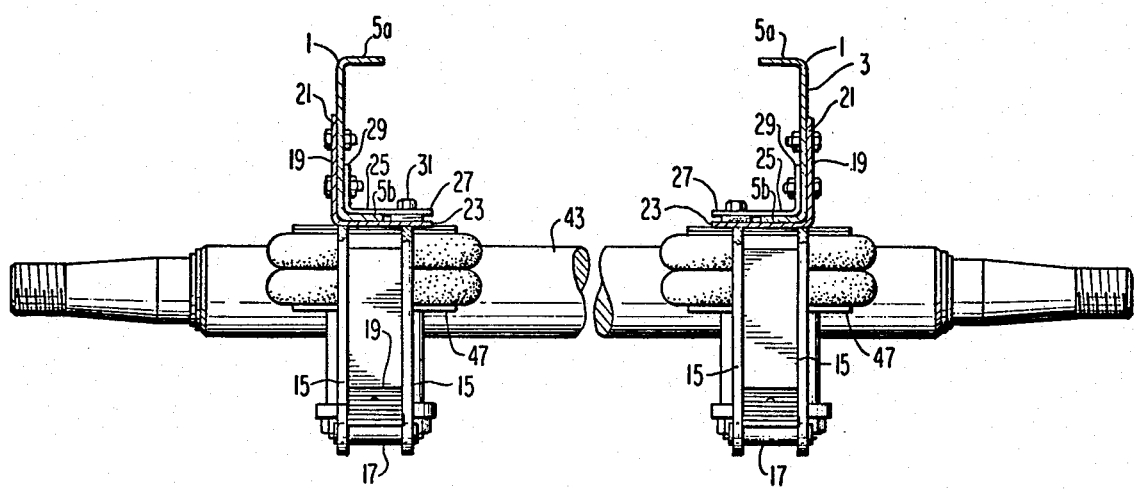
FIG. 2 is a partial rear plan, partially sectionalized view taken along line 2–2 of FIG. 1.
Figure 3:
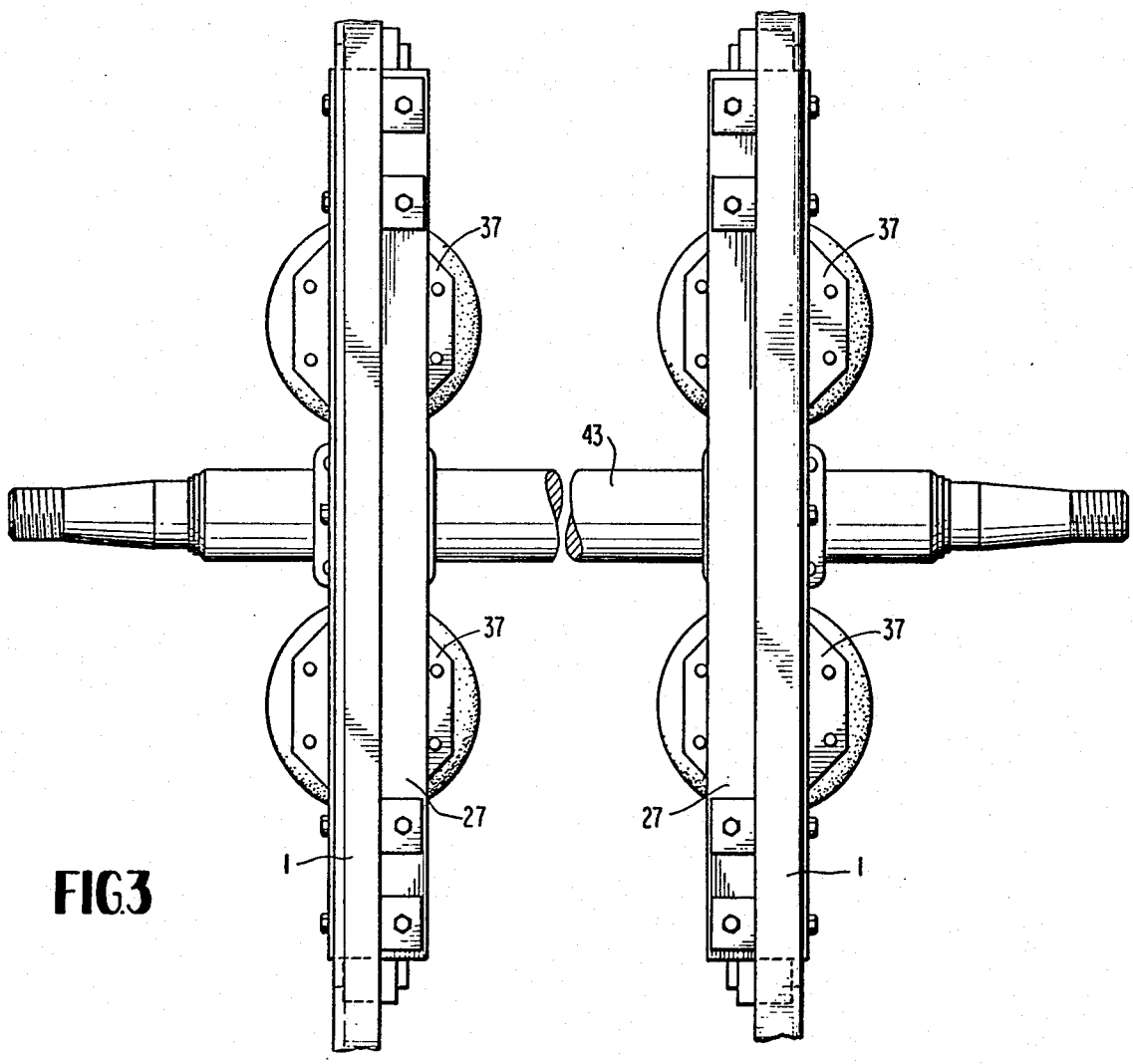
FIG. 3 is a top plan view of the system of FIG. 1.

As best illustrated in FIG. 2, frame member 1 is generally comprised of a C-beam having a vertical leg (web) 3 and two substantially horizontal flanges 5a and 5b. Such a frame member is of conventional design and constitutes no part of the subject invention. Other conventional frames are also adaptable for use in connection with the auxiliary axle suspension system of the invention, such as L-beams, I-beams, and the like.

Numeral 7 generally indicates a particularly preferred auxiliary axle suspension system in accordance with this invention. Generally speaking system 7 includes two normally, upwardly biased leaf springs 9 containing a plurality of leaves, the number of leaves being dictated by the load bearing capacity of the system and other known factors. Leaf springs 9 are retained, in preferably sliding relationship, at their ends 11 by spring hanger bracket means 13 which, as best illustrated in FIG. 2, comprises dual downwardly extending plates 15 and retaining rod 17.

Hanger bracket means 13 are connected to frame member 1 so as not to violate the metallurgical integrity of horizontal flanges 5b of frame 1. This is accomplished, by employing, as generally disclosed in the aforementioned U.S. Pat. No. 3,617,072, an L-shaped flange 19, having a vertical leg 21 and a horizontal leg 23. As best illustrated in FIG. 2, horizontal leg 23 extends beyond the horizontal limit of horizontal flange 5b. In addition, an inner L-flange 25 having a horizontal leg 27 and vertical leg 29 is provided to be contiguous with the inner portion of frame member 1. Similarly with respect to horizontal leg 23, horizontal leg 27 extends beyond the horizontal limit of horizontal flange 5b. Spring hanger bracket means 15, is then attached to frame member 1 by bolting through vertical leg 3 of frame member 1 and bolting through that portion of L-flanges 19 and 25 (i.e., horizontal legs 23 and 27 thereof) which extends beyond the horizontal limit of flange 5b. This is generally illustrated by the bolt at 31. By such a technique, the advantages of a bolting mechanism rather than a welded joint are achieved. At the same time, the safety of a nonviolated beam flange is also achieved.

As illustrated, a unique unitized configuration is provided by employing L-shaped flange 19 of sufficient length such that the offset (from the axle), space-saving bags 33 are located by simple economic means (hereinafter more fully described) in a spread configuration as described above (i.e. the center lines usually being offset about 1 ½ – 2 inches inwardly due to tire size). In addition, springs 9 are located substantially directly under (as defined above) frame member 1 in a strong, safe and economic manner by (see FIG. 2 particularly) welding or otherwise connecting hanger bracket means 13 directly to horizontal leg 23 of L-flange 19. While in practice this may result for most conventional C-beams, in the center line of spring 9 being offset slightly inwardly of the center line of frame member 1 (usually about ¼ – 2 inches) such is more than compensated for by the uniquely advantageous nature of the unitized design.

In auxiliary axle suspension system 7 each pair of vertically flexible pneumatic chambers 33 are flexed by applying or relieving air pressure therein through air lines 35 in a manner similar to that as disclosed in U.S. Pat. No. 3,285,621 and more fully discussed hereinafter. The entire disclosure of both this patent and U.S. Pat. 3,617,072, is incorporated herein by reference. Flexible pneumatic chambers 33 are connected, preferably, directly to plates 37 which in turn are welded, or bolted to the underside of horizontal leg 23 of flange 19, which in turn connects to the frame member 1.

While various means may be devised to locate the chambers and horizontal force component means as taught so as to provide the strength necessary to certify the systems of this invention at the high load bearing capacities indicated, it is preferred that such means comprise in part a load-arm means 39 which, as illustrated in FIGS. 1 and 4, provides a saddle portion 41 which substantially overrides the central portion of leaf spring 9. Saddle portion 41 of load-arm means 39 is of sufficient length so as to offset pneumatic chambers 33 from the vertical plane of auxiliary axle 43. Load-arm means 39 is also provided with upwardly extending legs 45 which, at their termination, provide a platform 47 to which the pneumatic chambers 33 are attached. As best illustrated in FIGS. 2, 3, and 4, saddle portion 41 and upwardly extending legs 45 are longitudinally arranged so as to locate, as hereinabove mentioned, pneumatic chambers 33 in a spread configuration under frame 1.

Leaf spring 9 is connected at about its substantially central portion, in its normally upwardly biased position, to auxiliary axle 43 by retaining means generally illustrated at 49. While spring 9 could be overslung axle 43 and differently shaped load-arm means 39 designed so as to allow for such a configuration, it is preferable to have leaf springs 9 underslung axle 43 (so as to further conserve space) and connect same to axle 43 by means of connecting means 49 which generally comprise dual U-bolts 41 which, in their inverted U position, override axle 43 and retain leafspring 9 and load-arm means 39 in place by means of horizontal retaining plate 43 through which bolts 51 extend. Bolts 51 are engaged to plate 53 by nut means as illustrated. Juxtapositioned between axle 43 and load-arm means 39 are surface conforming means 55 which conform the round surface of axle 43 with the substantially flat surface of saddle portion 41.

As stated above, the location of chambers 33 in spread configuration may be sufficient in certain instances to achieve the desired strength and thus no horizontal force component means need be employed. On the other hand, it is preferred, rather than having one or the other of these strengthening factors present to have both present such that an extremely strong and reliable system is provided using only conventional tubular axles of conventional thickness (i.e. about one-half or five-eighths inches). Thus, in the preferred embodiments of this invention, as best illustrated in FIG. 1, there is provided, in addition to spread chambers, a means for taking up the horizontal force components of braking and dynamic operating forces in accordance with the teachings of this invention. While, as will be later discussed, such means could be the leaf springs themselves, by shackling preferably the forward end of the spring to front retaining rod 17, it is preferred that such means assumes the form of a "radius rod" or torque arm mechanism 57 of conventional design (on one side there being an adjustable portion 59 while on the torque arm on the other side of the vehicle there need not be this adjustable mechanism). Torque arm 57 may be provided in a number of configurations. It is preferable however to attach it by one end directly to hanger bracket means 13 either extending in the forward or rearward direction in which the vehicle travels, preferably in the forward direction, and attach it at its other end to the bottom portion of the plate 53 of axle connecting means 49. By such a connection, location of arm 57 substantially directly under frame member 1 is most easily achieved.

Attention is now directed to FIGS. 8 and 9 wherein there is illustrated a further embodiment of this invention which employs a drop-axle rather than a straight axle as illustrated in FIGS. 1–4 and wherein leaf springs 9 are shackled so as to assume the role of the aforementioned horizontal force component means. All parts in this suspension system are substantial duplicates of those illustrated in FIGS. 1–4, except of course, for the employment of drop-axle 101 consisting of an upper leg stub-axle portion 104 and a lower horizontal leg 105. Stub 104 and horizontal leg 105 are connected by conventional "figure eight" means 103 as illustrated. As can be seen from FIGS. 8 and 9, excellent strength is built into this system by the location of the chambers in a spread configuration and the springs substantially directly under the frame member of the vehicle. In addition, because of the offset provided by means 103, such a system serves well on low-slung frame vehicles and particularly on vehicles having inordinately low frame clearances.

In the embodiment illustrated in FIGS. 8 and 9, maximum space is conserved by eliminating the use of a torque arm as illustrated in FIGS. 1–4 of the previously discussed embodiment. The elimination of the torque arm carries with it the employment of shackle connection 102 wherein either the rearward or forward, but preferably forward end of the spring is shackled or otherwise looped about the rod in the forward-most spring-hanger bracket. Such a connection provides stability to the system without a torque arm in that the spring now serves as the horizontal force component means while, on the other hand, the unshackled end of the spring is allowed to slide as per the embodiment of the previous figures. It has been found that with this new space-saving and strong embodiment the torque arm may be eliminated from many models and still provide the necessary safety and reliability for use, particularly on inordinately low slung framed vehicles which heretobefore could not be fitted with a positive return system. On the other hand, if the frame is not too inordinately low, or if it is only relatively low or has a high frame, then, of course, the torque arm may be provided similarly as illustrated in FIGS. 1–4 for additional safety.

As described hereinabove, one of the most important features of this invention is the achievement of high certifiable strengths, economically, by locating either the horizontal force component means or the chambers, and preferably both, in the specified manner as described above with relation to its corresponding frame member. In the preferred embodiments illustrated in FIGS. 1–4 and 8–9, the springs, torque arms, and the chambers are all positioned in such a manner in order to maximize the benefits of this invention. On the other hand, there are instances where for design or other reasons, it may not be desirable or possible to achieve this ultimate result. In such instances, then, at least one or the other of the horizontal force component means or the chambers should be located substantially directly under the frame member.

For example, increased certifiable strengths are achievable in accordance with the teachings of this invention, in the four-bag prior art device described above, if the bags are spread so as to locate them in a spread configuration rather than significantly offsetting them interiorly as is currently done. Such a spreading, in turn, necessitates the relocation of the leaf springs since, as described, they are currently overslung the axle and are located between the wheel and the frame member, thus interfering with the spreading necessary if higher certifiable strengths are to be achieved. This could be accomplished in a variety of ways such as by underslinging the spring to the axle or locating them internally of the frame member. While maximum results are not achieved because outboard pins (in the case of underslinging) or other weakening or economic factors would still be present, a modicum of increase in strength and other beneficial factors would be achieved. Similarly, a modicum of increase in strength and other factors would be achieved if a torque arm were provided in the correct location and/or if the springs were relocated so as to be substantially directly under the frame member while the bags were allowed to remain in their offset position.

Figure 10:
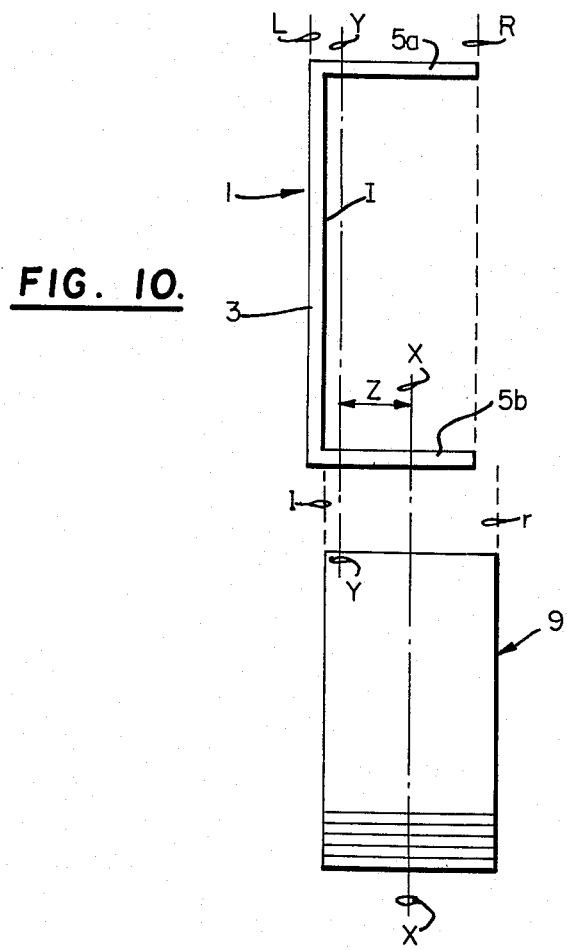
FIG. 10 is a rear-view schematic illustrating the "substantially directly under" nature of the springs and/or horizontal force compensating means as contemplated by this invention.
Figure 11:
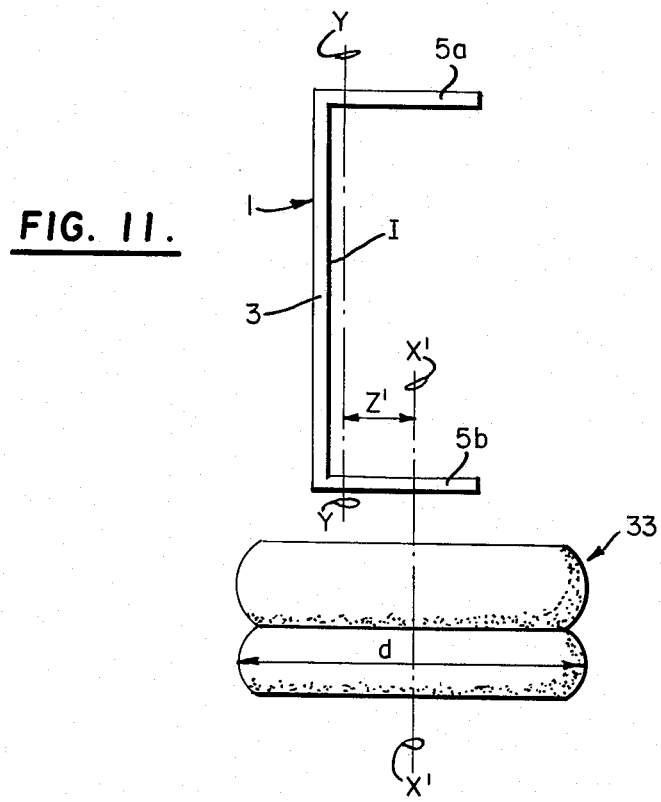
FIG. 11 is a rear-view schematic illustrating the in a spread configuration nature of the chambers as contemplated by this invention.

Within this context, then, FIGS. 10–11 are presented so as to schematically illustrate the concepts of in a spread configuration and "substantially directly under" as they are used in accordance with this invention. FIG. 10 illustrates the concept of substantially directly under as it relates to the leaf springs 9. The same considerations are of course applicable when a torque arm is employed. As illustrated the extremities of frame member 1 are defined by planes L and R. In this instance a C-beam is illustrated and thus the other extremities are defined on the left by the lefthand surface of vertical member (web) 3 and on the right by the righthand surface of equally wide horizontal flanges 5a and 5b. Line Y—Y then defines the center line (i.e. neutral axis or center of gravity) of frame member 1. As an example of a typically employed truck or trailer frame member, C-beam 1 would be about one-fourth inch thick, web 3 would be about 10 inches, while legs 5a and 5b would be 3 inches. In such a beam, center line Y—Y is almost contiguous with internal surface I of web 3.

In like manner, planes l and r define the outer extremities of spring 9. In accordance with the teachings of this invention, in order for spring 9 (or torque arm 57) to be considered substantially directly under the frame member, either l or r should fall between L and R or vice verse [such as where spring 9 (or torque arm 57) is wider than flange 5b]. In other words, the vertical planes of the extremities of spring 9 (or torque arm 57) and member 1 must in some way overlap in the horizontal direction. As illustrated, this is accomplished by presenting 1 to the right of L.

In more preferred forms, more precise centering of spring 9 (or torque arm 57) under frame member 1 is desirable. Generally, more precise centering may be defined by the requirement that center line X—X lie between planes L and R. Even more precise centering may be defined by reference to distance Z (which may lie either to the right or left of line Y—Y) which as illustrated, defines the distance between frame member center line Y—Y and spring (or torque arm) center line X—X. In general Z should be less than about 2 inches and preferably less than about 1 ½ inches.

FIG. 11 best illustrates what is meant by the concept that chambers 33 are to be located in a spread configuration. This is best accomplished by reference to distance Z' and its relation to diameter d of chambers 33 in expanded form. Distance Z' as illustrated is that inwardly extending distance between center-line Y—Y (as discussed with reference to FIG. 10) and center line (i.e., neutral axis or center of gravity) X'—X' of chambers 33.

Generally speaking, to be considered in a spread configuration in accordance with this invention the distance Z' should not be greater than about 20% of d and preferably not greater than about 10%. Strength and other beneficial factors increase the smaller Z' becomes. While it may not always be practical to have Z' substantially equal to zero or actually a negative value (such as when the bags would be located somewhat outboard of frame member 1), generally speaking excellent results are achieved if Z' is not more than about 1 ¾ inches and preferably less than 1 inch on air bags where d is about 12 - 13 inches.

Figure 6:
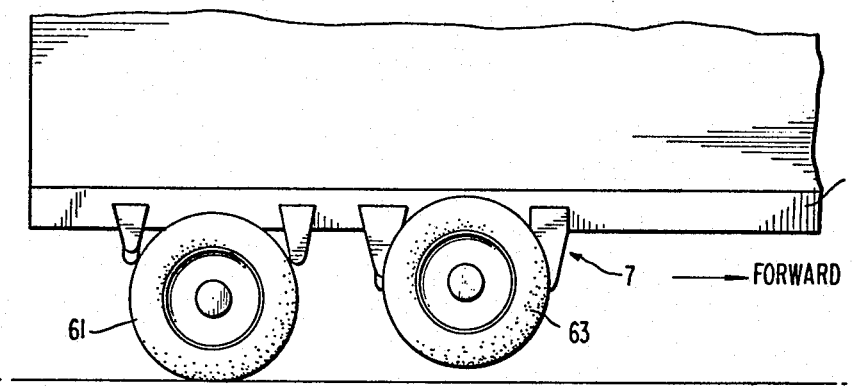
FIG. 6 is a fragmentary side elevational view of the rear portion of a wheeled vehicle embodying this invention, the auxiliary axle being shown in a non-load bearing position relative to the vehicle.
Figure 7:
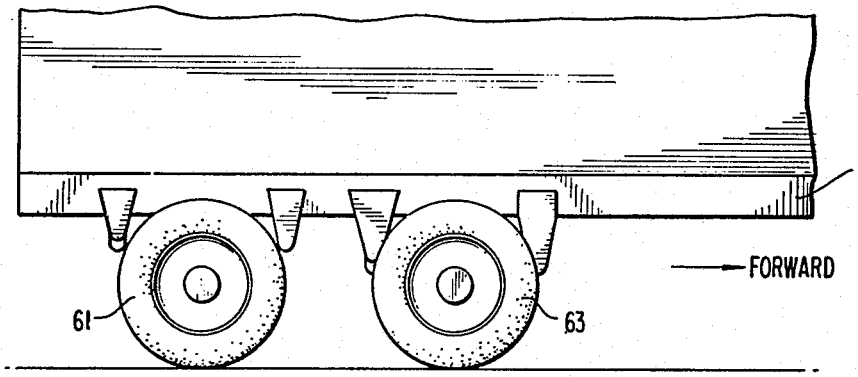
FIG. 7 is a view similar to FIG. 6 but with the auxiliary axle being shown in its load-bearing position relative to the vehicle.
Figure 5:
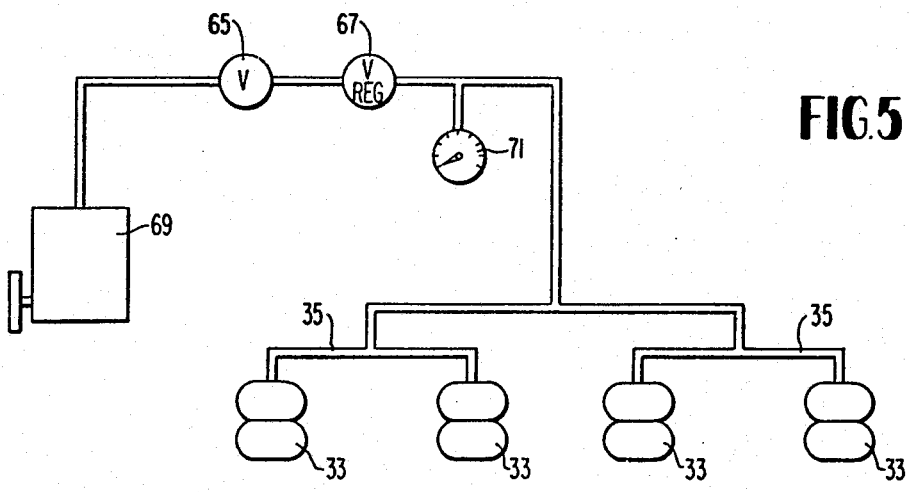
FIG. 5 is a diagrammatic view of one example of means for controlling operation of the auxiliary axle systems of this invention.

Referring now to FIGS. 5–7 there is illustrated the operation of the subject invention as it applies to a wheeled vehicle having a stationary wheeled axle 61 as a primary means of support and an auxiliary axle suspension system of this invention either with a straight or drop-axle. As illustrated in FIG. 6, system 7 normally biases auxiliary axle 43 (or 101) upwardly so as to hold wheels 63 from engagement with the road surface, and this is true despite the fact that the wheeled vehicle may have a frame member 1 built relatively low or inordinately low to the ground.

By using a valve and line mechanism such as that illustrated in FIG. 5 to provide air to lines 35, auxiliary axle 43 (or 101) may be forced downwardly to bring wheels 63 into engagement with the road surface as illustrated in FIG. 7. For example, with wheels 63 in their normally retracted position (FIG. 6), the driver of the vehicle may actuate, preferably from the driver's cab, manual control valve 65. Through regulating valve 67, compressed air from compressor 69 is sent via lines 35 to flexible pneumatic chambers 33. The desired pressure is maintained by valves 65 and 68 and recorded on gauge 71. As air is admitted to chamber 33 they expand vertically, forcing load-arm means 39 against leaf spring 9 and driving leaf spring 9 and axle 43 (or 101) downwardly until wheels 63 contact the road surface. When wheels 63 are no longer needed as load-bearing, valve 65 is activated to relieve the air pressure in chambers 33, and the normal upwardly biasing force of springs 9 returns axle 43 (or 101) to its retracted position.

The above-described suspension systems are very strong and reliable and may be used wherever auxiliary systems are necessary, regardless of whether the frames of the vehicle are highly or normally elevated from the road surface or whether they are relatively close thereto. Thus these systems may be employed on trailers and trucks with relatively high frames, for example, 35 to 38 inches from the road surface. On the other hand, they may be employed with relatively low framed trailers and trucks for example 27 to 34 inches from the road surface; or they may be employed on low framed trucks and other vehicles having inordinately low frames, for example 26–24 inches from the road surface. Equally as important is the fact that the preferred embodiments of this invention, particularly those specifically described above, are certifiable under the new and rigorous federal regulations for carrying loads greater than about 18,000 lbs./axle and often at about 20,000 lbs./axle.

Once given the above disclosure, many other features, modifications and improvements will become apparent to the skilled artisan. Such other features, modifications and improvements are therefore considered to be a part of this invention, the scope of which is to be determined by the following claims.

We claim:

1. A lift-axle suspension system for a wheeled vehicle having a longitudinally extending frame member adjacent each side of said vehicle, said system when mounted on said vehicle connecting a wheel-bearing axle to said frame members in a manner to allow said axle to be alternately lowered and raised, thereby lowering said wheel into and raising said wheel from road engagement, the system comprising:
   longitudinally extending normally upwardly biased leaf springs;
   spring hanger means for retaining the leaf springs at their end portions;
   means for connecting the suspension system to said axle;
   longitudinally extending offsetting means mountable at about said means' central portion below and to said axle by said axle connecting means, said offsetting means retaining said leaf springs in mountable underlying relation to said axle;
   said offsetting means having ends forward and aft of said central portion which terminate in support means for the lower portion of a pneumatic system;
   said pneumatic system comprising a vertically flexible pneumatic chamber extending between each of said support means and a respective frame member when the system is mounted on said vehicle such that when pneumatic pressure is applied to the chambers they expand, forcing the wheel into engagement with the road surface and such that when the pressure is released, the normal upward bias of the leaf springs lifts the wheel out of road engagement;
   the system being further characterized by said spring hanger means and said offsetting means being located in said system such that when the system is mounted on said vehicle, said leaf springs are located substantially directly under their respective longitudinally extending frame members.

2. The system of claim 1 wherein said system further includes a radius rod, which when said system is mounted on said vehicle, is located substantially directly under its respective longitudinally extending frame member.

3. The system of claim 1 wherein said leaf springs are semi-elliptic and wherein for a respective semi-elliptic leaf spring, one spring hanger means is located forward and one aft of said offsetting means.

4. A lift-axle suspension system for a wheel vehicle having a longitudinally extending frame member adjacent each side of said vehicle, said system when mounted on said vehicle connecting a wheel-bearing axle to said frame members in a manner to allow said axle to be alternately lowered and raised, thereby lowering said wheel into and raising said wheel from road engagement, the system comprising:

two longitudinally extending normally upwardly biased leaf springs;
spring hanger means for retaining the leaf springs at their end portions;
means for connecting the suspension system to said axle;
longitudinally extending offsetting means mountable at about its central portion below and to said axle by said axle connecting means, said offsetting means retaining said leaf springs in mountable underlying relation to said axle;
said offsetting means having ends forward and aft of said central portion which terminates in support means for the lower portion of a pneumatic system;
said pneumatic system comprising a vertically flexible pneumatic chamber extending between each of said support means and a respective frame member when the system is mounted on said vehicle such that when pneumatic pressure is applied to the chambers they expand, forcing the wheel into engagement with the road surface and such that when the pressure is released, the normal upward bias of the leaf spring lifts the wheel out of road engagement;
the system being further characterized by said vertically flexible pneumatic chambers being located in a spread configuration when said system is mounted on said vehicle.

5. The system of claim 4 wherein said spring hanger means and said offsetting means are located in said system such that when said system is mounted on said vehicle, the leaf springs are located substantially directly under their respective longitudinally extending frame member.

6. The system of claim 5 wherein said system further includes a radius rod, which when said system is mounted on said vehicle, is located substantially directly under a respective longitudinally extending frame member.

7. The system of claim 5 wherein the center line of each chamber is spaced a distance not more than 20% the width of the chamber inwardly from said center line of said frame member when the system is mounted on said vehicle.

8. The system of claim 7 wherein said distance is not more than about 2 inches.

9. The system of claim 5 wherein said offsetting means comprises a load arm means adapted to overlie the central portion of the leaf spring and underlie the axle, said load arm means including a substantially horizontal saddle portion within the confines of which said central portion of said leaf spring is retained, and an upwardly extending arm at either end of said load arm, at the top of each arm therebeing a platform upon which the lower portion of said chambers is supported.

10. The system of claim 5 wherein said leaf springs are semi-elliptic and wherein for a respective semi-elliptic leaf spring one spring hanger means is located forward and one aft of said offsetting means.

11. In a wheeled vehicle having longitudinally extending frame members in side-by-side relation and each frame member being disposed adjacent a respective side of said vehicle, first and second axles underlying said frame members and extending transversely thereof, said axles being spaced from each other longitudinally of said vehicle and each mounting wheels along which the vehicle may travel, means connecting said first axle to said frame members whereby said first axle provides a primary means of vehicle support and a lift-axle suspension system for raising and lowering said second axle so as to raise or lower said wheels mounted thereon out of or into contact with the travel surface of said vehicle, the improvement comprising as the lift-axle suspension system the system as defined in claim 1 wherein said lift axle is mounted substantially perpendicularly to the longitudinal direction of the frame members, said offsetting means are connected at about said means' central portion below and to said lift-axle by said axle connecting means, said springs being retained by said offsetting means so as to underly said lift-axle, said system being mounted on said vehicle such that said leaf springs are located substantially directly under their respective longitudinally extending frame members and such that said vertically flexible pneumatic chambers extend between each of said support means and a respective frame member such that when pneumatic pressure is applied to the chambers they expand, forcing the wheel into engagement with the road surface and such that when pressure is released, the normal upward bias of the leaf springs lifts the wheel out of road engagement.

12. The system of claim 11 wherein said system further includes a radius rod located substantially directly under its respective longitudinally extending frame member.

13. In a wheeled vehicle having longitudinally extending frame members in side-by-side relation and each frame member being disposed adjacent a respective side of said vehicle, first and second axles underlying said frame members and extending transversely thereof, said axles being spaced from each other longitudinally of said vehicle and each mounting wheels along which the vehicle may travel, means connecting said first axle to said frame members whereby said first axle provides a primary means of vehicle support and a lift-axle suspension system for raising and lowering said second axle so as to raise or lower said wheels mounted thereon out of or into contact with the travel surface of said vehicle, the improvement comprising as the lift-axle suspension system the system as defined in claim 4 wherein said lift axle is mounted substantially perpendicularly to the longitudinal directions of the frame members, said offsetting means are connected at about said means' central portion below and to said lift-axle by said axle connecting means, said springs being retained by said offsetting means so as to underly said lift-axle said system being mounted on said vehicle such that said vertically flexible pneumatic chambers are in a spread configuration and such that said verticaally vertically pneumatic chambers extend between each of said support means and a respective frame member such that when pneumatic pressure is applied to the chambers they expand, forcing the wheel into engagement with the road surface and such that when pressure is released, the normal upward bias of the leaf springs lifts the wheel out of road engagement.

14. The system of claim 13 wherein said leaf springs are located substantially directly under their respective longitudinally extending frame members.

15. The system of claim 14 which further includes a radius rod located substantially directly under a respective longitudinally extending frame member.

16. The system of claim 14 wherein the center line of each chamber is spaced a distance not more than about 2 inches inwardly from said center line of said frame member and wherein the center line of the leaf springs fall between the vertical planes of the horizontal extremities of their respective frame members.

17. The system of claim 14 wherein said offsetting means comprises a load arm means overlying the central portion of its respective leaf spring and underlying said lift-axle, said load arm means including a substantially horizontal saddle portion within the confines of which said central portion of said leaf spring is retained, and an upwardly extending arm at either end of said load arm, at the top of each arm there being a platform upon which the lower portion of said chambers is supported.

* * * * *

UNITED STATES PATENT OFFICE
CERTIFICATE OF CORRECTION

Patent No. 3,877,718   Dated   April 15, 1975

Inventor(s)   Raymond M. Scanlon et al.

It is certified that error appears in the above-identified patent and that said Letters Patent are hereby corrected as shown below:

On the cover sheet item [73] should read

-- TWM Manufacturing Company, Inc., Canton, Ohio by said Raymond M. Scanlon; and WDT, Warren, Ohio by said Stephen Turner, Jr. --.

Column 1, line 66, "saic" should read -- said --. Column 4, lines 51 to 59, "relatively high", "relatively low", and "inordinatley low", when used should be in quotes.

Column 7, line 46, "horizontaal" should read -- horizontal --. Column 12, lines 35-36, the term "in a spread configuration" should be in quotes. Claim 4, line 1, "wheel" should read -- Wheeled --. Column 16, line 60, cancel "verticaally"; line 61, after "vertically" insert -- flexible --.

Signed and sealed this 24th day of June 1975.

(SEAL)
Attest:

RUTH C. MASON
Attesting Officer

C. MARSHALL DANN
Commissioner of Patents
and Trademarks